US010891413B1

(12) United States Patent
Kundarewich et al.

(10) Patent No.: US 10,891,413 B1
(45) Date of Patent: Jan. 12, 2021

(54) INCREMENTAL INITIALIZATION BY PARENT AND CHILD PLACER PROCESSES IN PROCESSING A CIRCUIT DESIGN

(71) Applicant: Xilinx, Inc., San Jose, CA (US)

(72) Inventors: Paul D. Kundarewich, Toronto (CA); Grigor S. Gasparyan, San Jose, CA (US); Mehrdad Eslami Dehkordi, Los Gatos, CA (US); Guenter Stenz, Niwot, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/704,762

(22) Filed: Dec. 5, 2019

(51) Int. Cl.
*G06F 30/333* (2020.01)
*G06F 30/392* (2020.01)
*G06F 30/327* (2020.01)
*G06F 111/04* (2020.01)

(52) U.S. Cl.
CPC .......... *G06F 30/333* (2020.01); *G06F 30/327* (2020.01); *G06F 30/392* (2020.01); *G06F 2111/04* (2020.01)

(58) Field of Classification Search
USPC .......................................................... 716/104
See application file for complete search history.

(56) References Cited

U.S. PATENT DOCUMENTS

| | | | |
|---|---|---|---|
| 2009/0031277 A1* | 1/2009 | McElvain | G06F 30/392 716/104 |
| 2009/0254874 A1* | 10/2009 | Bose | G06F 30/39 716/113 |
| 2015/0135154 A1* | 5/2015 | Fung | G06F 30/394 716/113 |

* cited by examiner

*Primary Examiner* — Mohammed Alam
(74) *Attorney, Agent, or Firm* — Crawford Maunu PLLC

(57) ABSTRACT

Disclosed approaches for processing a circuit design include providing access to checkpoint data of a design checkpoint of a circuit design and starting child processes by a parent process. An initial intermediate representation is generated by the parent process, and concurrent with the generating of the initial intermediate representation, the child processes load the checkpoint data into respective memory spaces. The parent process produces incremental updates to the design checkpoint. The parent process signals availability of the incremental updates to the child processes, which apply the incremental updates to the checkpoint data in the respective memory spaces. The child processes process the circuit design in response to completion of producing incremental updates by the parent placer process.

20 Claims, 5 Drawing Sheets

INCREMENTAL INITIALIZATION BY PARENT AND CHILD PLACER PROCESSES IN PROCESSING A CIRCUIT DESIGN

TECHNICAL FIELD

The disclosure generally relates to processing circuit designs.

BACKGROUND

A circuit design flow generally entails design capture, synthesis, mapping, place-and-route, and generation of implementation data for making or configuring a target integrated circuit (IC) device. Simulation steps can also be performed at various points in the design flow to evaluate correct behavior and performance.

Parallel processing approaches are often employed in the design flow in an effort to reduce the time required for performing place-and-route. For example, in one approach a parent placer process performs initialization and floorplanning functions and then starts multiple child placer processes to perform detailed placement of the circuit design. The child processes can execute in parallel on multiple processor cores or computers and thereby reduce the time required for placement.

However, before the child placer processes can begin performing detailed placement functions, the parent placer process must complete the initialization and floorplanning functions. Design flow data generated from initialization and floorplanning is required by the child placer processes for performing their detailed placement functions. Thus, a designer may experience significant delays as a result of the child placer processes waiting for the parent placer process to complete and the child placer processes then having to input the initialization and floorplanning data generated by the parent.

SUMMARY

A disclosed method includes providing access to checkpoint data of a design checkpoint of a circuit design and starting a plurality of child processes by a parent process executing on one or more computer systems. The method has the parent process generating an initial intermediate representation of the circuit design targeted to an integrated circuit (IC) device, and the plurality of child processes executing on the one or more computer systems loading the checkpoint data into respective memory spaces concurrent with the generating of the initial intermediate representation. The parent process produces incremental updates to the design checkpoint. The parent process signals availability of the incremental updates to the plurality of child processes. The method includes the child processes applying the incremental updates to the checkpoint data in the respective memory spaces in response to the signaling availability of the incremental updates and processing the circuit design in response to completion of producing the incremental updates by the parent placer process.

A disclosed system includes a processor arrangement and a memory circuit coupled to the processor arrangement. The memory circuit is configured with instructions that when executed by the processor arrangement cause the processor arrangement to perform operations including providing access to checkpoint data of a design checkpoint of a circuit design and starting a plurality of child processes by a parent process. The operations include generating an initial intermediate representation of the circuit design targeted to an integrated circuit (IC) device by the parent process, and loading, concurrent with the generating of the initial intermediate representation, the checkpoint data into respective memory spaces by the plurality of child processes. The operations include the parent placer process producing incremental updates to the design checkpoint. The operations include the parent process signaling availability of the incremental updates to the plurality of child processes, and the child processes applying the incremental updates to the checkpoint data in the respective memory spaces in response to the signaling availability of the incremental updates. The operations include the child processes processing the circuit design in response to completion of producing the incremental updates by the parent placer process.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
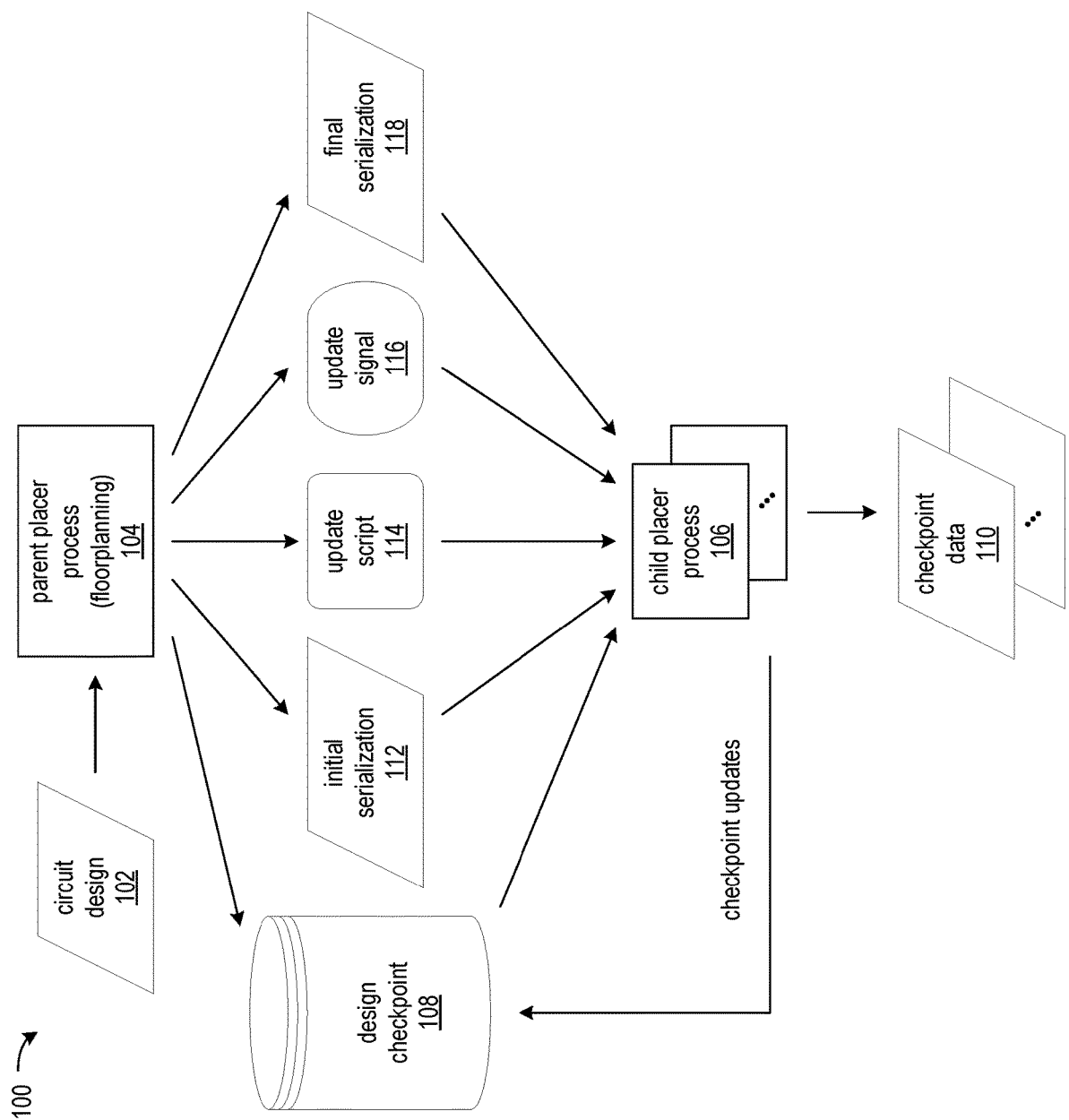
FIG. 1 shows a dataflow diagram for placer processes operating consistent with the disclosed approaches.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches reduce delays experienced in prior approaches for circuit design placement. In the disclosed approach, the child placer processes are started before the parent placer process completes its initialization and floorplanning processes. The parent process writes preliminary initialization data to a checkpoint database. Concurrent with the parent placer process performing initialization, the child processes read the preliminary data. The parent process can continue with initialization and floorplanning, and during the further initialization and floorplanning the parent process signals incremental updates to the checkpoint database to the child processes. In response to the signals indicating incremental updates, the child processes update their local versions of the checkpoint data. As a large part of the initialization activities of the child processes are performed concurrently with the parent process performing initialization and floorplanning, the time required for the child processes to complete initialization once the parent process is complete will be greatly reduced. Though the approaches for processing a circuit design are described relative to placement, it will be appreciated that the approaches can be extended and/or adapted to synthesis and routing phases of a circuit design flow.

FIG. 1 shows a dataflow diagram for placer processes operating consistent with the disclosed approaches. The dataflow 100 is a subset of an overall design flow that includes design capture, synthesis, mapping, place-and-route, and generation of implementation data. Circuit design 102 includes design data generated in the synthesis and mapping stages of the design flow. The placer processes include a parent placer process 104 and multiple child placer processes 106. The parent and child placer processes can execute on a single computer system (not shown) having multiple processor cores or on multiple computer systems connected by a local area or wide area network.

The parent placer process 104 performs initialization and floorplanning concurrent with the child placer processes 106 receiving data generated by the parent placer process and initializing their local data structures. In an exemplary application, the target IC can have field programmable gate array (FPGA) circuitry disposed on multiple semiconductor dice and assembled into a unitary package. Each die having FPGA circuitry is sometimes referred to as a "super logic region" or "SLR." For this type of target IC device, the parent placer process generally determines which portions of the circuit design will be placed on which SLR and the separate child placer processes each perform a detailed placement of one of the portions. The disclosed approaches can be similarly applied to application specific integrated circuits (ASICs) and/or target devices that are implemented as a single die.

The parent placer process 104 generally prepares data that is used by the child placer processes 106. The data generated by the parent processor includes a design checkpoint 108, initial serialization data 112, update scripts 114, and final serialization data 118. The update signal 116 is a mechanism through which the parent placer process communicates to the child placer processes that incremental updates to the design checkpoint are available.

The parent placer process initially writes a design checkpoint 108, which is generated from circuit design 102, to a storage device and then starts multiple child placer processes. The design checkpoint 108 can be stored as a database that includes information such as the circuit design netlist and constraints. The parent process can generate an initial high-level placement of the circuit design on the target IC device and store the high-level placement information as part of the design checkpoint 108. The initial placement can specify partitions of the netlist and placement of those partitions on different areas of the target IC device. As applied to synthesis and routing phases of the design flow, a parent process can generate an initial intermediate representation of the circuit design suitable for that phase.

After writing the design checkpoint and before commencing floorplanning, the parent placer process starts the child placer processes so that the child placer processes can, concurrent with the parent performing floorplanning, commence loading the design checkpoint into local memory spaces. The respective copies of the design checkpoint 108 that are local to the child placer processes are shown as checkpoint data 110.

As part of the floorplanning performed by the parent placer process, the parent placer process serializes certain data from data structures of the parent placer process for communicating to the child placer processes. The data serialized by the parent placer process can specify area constraints, timing constraints, a netlist, and/or placement locations of elements in the netlist. The serialized data is shown as initial serialization data 112.

The parent placer process signals availability of the initial serialization to the child placer processes via update signal 116. The mechanism through which the parent signals the child processes can be by creating a file, storing data in a file, storing data in a shared memory, or communicating through a socket, for example. In response to the update signal 116, the child placer processes deserialize the initial serialization into local data structures (not shown).

The parent placer process produces incremental updates to the design checkpoint as a result of floorplanning. The incremental updates can include netlist changes, shape changes of portions of the netlist, and/or placement changes, for example. The availability of an incremental update can be signaled by the parent placer process to the child placer processes through the update signal 116, which can include creating a file, storing data in a file, storing data in a shared memory, or communicating through a socket, for example.

The information of the incremental updates can be communicated to the child placer processes through the design checkpoint database 108 or through an update script 114. Some incremental updates may be communicated through updates to the shared design checkpoint database, and other incremental updates may be communicated through update scripts. Also, different incremental updates may be applicable to different ones of the child placer processes. Thus, each instance of the update signal 116 may be applicable to only a subset of the child placer processes.

In response to an update signal 116, one or more of the child placer processes apply the incremental update to the checkpoint data 110 in the respective local memory spaces. For an incremental update communicated through the shared design checkpoint database 108, the child placer process reads the incremental update from the shared database into the local checkpoint data. For an incremental update communicated through the update script 114, the child placer process executes the update script, and execution of the script updates the local checkpoint data 110 with the incremental update.

When floorplanning is complete, the parent placer process generates final serialization data 118. The final serialization data can include placement locations of elements in the netlist and data descriptive of states of the placement algorithms. The parent placer process generates an update signal 116 to alert the child placer processes of the final serialization, and the child placer processes deserialize the data and store as part of the local checkpoint data 110.

Once the final serialization data 118 has been deserialized, the child placer processes can commence performing detailed placement of the circuit design. Each of the child placer processes performs detailed placement of a respective portion of the circuit design. The detailed placement includes determining particular locations on the target IC device for each element in the netlist. At completion of detailed placement, each child placer process writes updated checkpoint data 110 back to the design checkpoint database 108.

Figure 2:
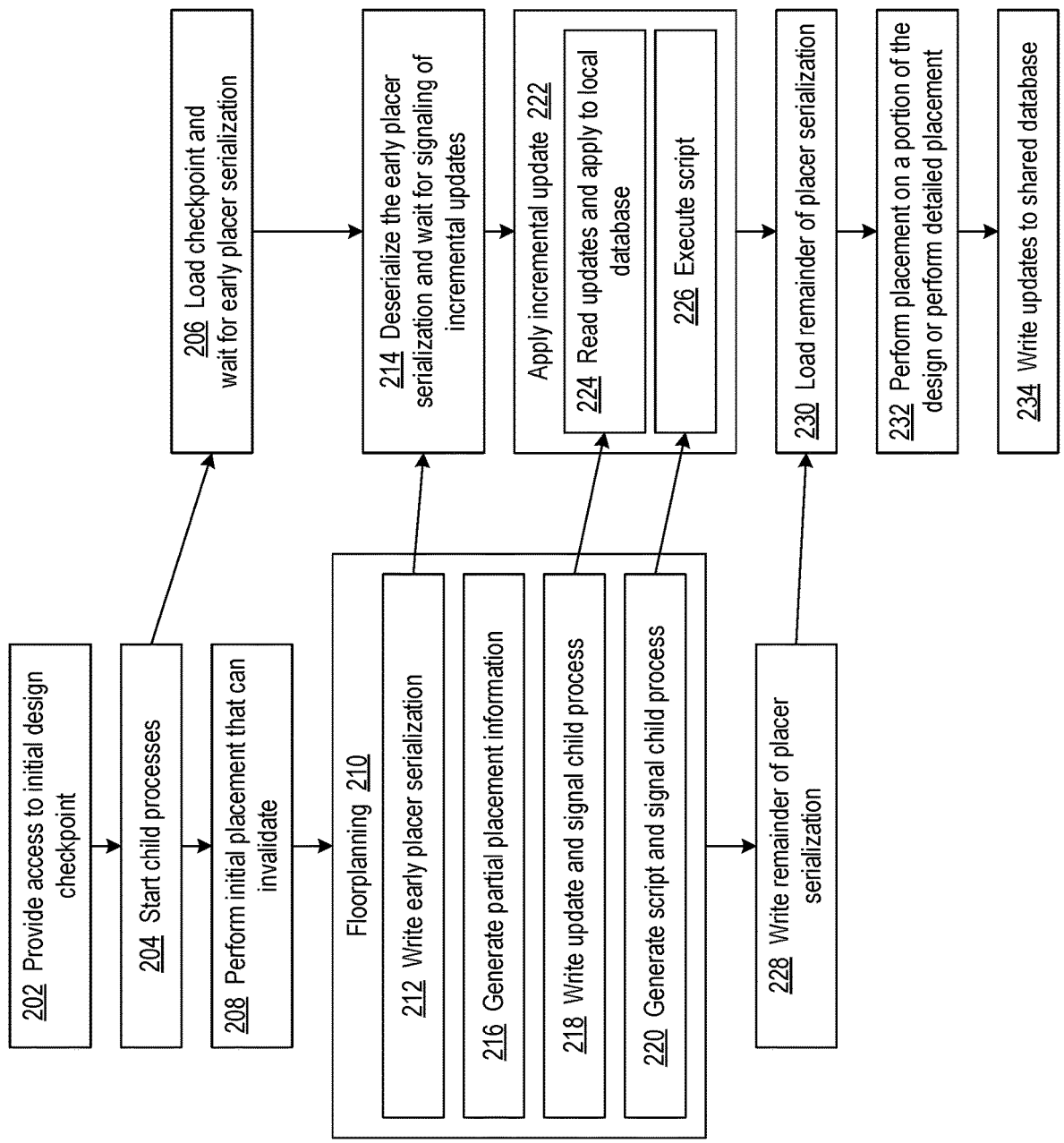
FIG. 2 shows a flowchart of a parent placer process and child placer processes executing consistent with the disclosed approaches.

FIG. 2 shows a flowchart of a parent placer process and child placer processes executing consistent with the disclosed approaches. The processing performed by the parent placer process is shown in the left column of blocks, and the processing performed by the child placer processes is shown by the right column of blocks. The time-relative sequence of the processing is generally illustrated from top to bottom. The relative positions of the process blocks shows concurrency of operations between the parent placer process and the child placer processes, and the child placer processes responding to signaling by the parent placer process.

At block 202, the parent placer process provides access to checkpoint data of the design checkpoint. The initial design checkpoint includes the circuit design netlist, timing constraints, placement constraints, and routing databases. In one approach, the checkpoint can be written to a database on a storage device that can be shared with the child placer processes The storage device can be a RAM, solid state memory disk (SSD), or a magnetic disk, for example. In an alternative approach, the parent placer process provides access to the checkpoint data by writing the checkpoint data to a socket.

The parent placer process starts the child placer processes at block 204. At block 206, each child placer process reads the initial design checkpoint from the shared storage device and stores the checkpoint data in memory space local to that child placer process.

After starting the child placer processes, the parent placer process at block 208 performs an initial placement of the circuit design. The initial placement has assigned an approximate placement location of portions of the netlist, which can be changed during floorplanning and detailed placement.

At block 210, the parent placer process performs floorplanning operations. The floor planning operations include serializing data from data structures of the parent placer process, generating partial placement data, which are communicated to the child placer processes as incremental updates, and signaling the child placer processes when incremental updates are available.

At block 212, the parent placer process serializes data from its data structures as early placer serialization for communicating to the child placer processes. The early placer serialization data can include timing constraints and placer netlists. The placer netlist is specific to the placer and is derived from the design checkpoint netlist. The serialized data can be written to a storage device to which the child placer processes also have access.

After serializing the data, the parent placer process signals the child placer processes that the serialized data is available. The signaling can be by way of creating a file, storing data in a file, storing data in a shared memory, or communicating through a socket, for example.

In response to the parent placer process signaling availability of the serialized data, at block 214 the child placer process(es) deserializes the data and stores the data in data structures local to the child. The state of the circuit design data held by each child placer process is equivalent to the state of the circuit design data held by the parent placer process at this point.

At block 216, the parent placer process generates partial placement information in response to placement constraints associated with the circuit design. The partial placement information can result in netlist changes, shape changes, and placement data, which can be communicated to the child placer process(es) as incremental updates. Though not shown, it will be recognized that the parent placer process will iterate over the circuit design and produce many incremental updates. Generally, the parent placer process signals the child placer process(es) once all design checkpoint changes are available.

The parent placer process can signal availability of an incremental update to the design checkpoint in one of two ways, which are shown as blocks 218 and 220. The child processes apply the incremental updates as shown by block 222. Incremental updates involving modifications to the design checkpoint netlist are communicated through generating a script (block 220), and all other incremental updates are communicated by writing the update to the shared design checkpoint database. At block 218, the parent placer process writes the update to the shared design checkpoint database and signals the child placer process(es) that an update is available. The parent placer process can signal an incremental update is available by writing to a shared file, shared memory, or to a socket, and the child placer processes can monitor/listen for the presence of the signal. The data written by the parent placer process to signal an incremental update specifies portions of the netlist for which the child placer process(es) are to read associated data from the design checkpoint database. For example, the parent placer process can write data that signals that initial design checkpoint has been written and is available. The various child placer processes read the updated data from the database and apply the update to the local checkpoint data at block 224.

At block 220, the parent placer process can signal an incremental update is available by providing a script that the child process(es) can execute. The child process(es) execute the script at block 226, and execution of the script updates the local checkpoint data. A general example of a line in a script is:

doReplication -elementToReplicate A -newElementName B -loadsFromReplicatedElement {set loads}

The exemplary script replicates netlist element A to create netlist element B with netlist element B driving the specified loads. Each child placer process can poll for the presence of a script to execute.

At block 228, the parent process serializes the remainder of data from the parent process data structures. That is, the data serialized at block 228 is the data from all the data structures that were not serialized at block 212. The placer serialization data written at block 228 can include area constraints, updated placer netlists, placer data structures, and placement locations for elements in the netlist and data that describe states of the placement algorithms. After serializing, the parent placer process signals the child placer processes that the final serialization is complete, such as by writing to a shared file, shared memory, or to a socket. In response, at block 230, the child placer processes deserialize the data and stores the data in data structures in local memory.

Initialization by the parent and child placer processes is complete after block 230, and the child placer processes can commence performing placement on a portion of the circuit design or performing detailed placement as is customary at block 232. Upon completion of performing its placement operations, the child placer process at block 234 writes the updated placement data back to the shared design checkpoint database.

Figure 3:
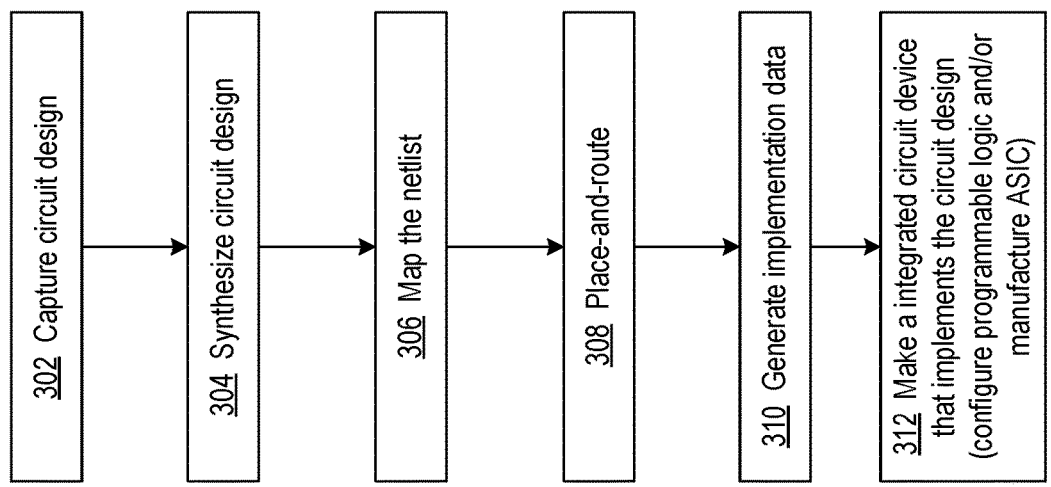
FIG. 3 shows a flowchart of a design flow for processing a circuit design consistent with the disclosed approaches for circuit design placement.

FIG. 3 shows a flowchart of a design flow for processing a circuit design consistent with the disclosed approaches for circuit design placement. The design flow can be supported by electronic design automation tools, such as the Vivado® design tool from XILNIX, Inc. At block 302, the design tool captures a circuit design, such as through a hardware description language or a graphical user interface having user-selectable and configurable function blocks. The circuit design can be synthesized at block 304 to produce a netlist, and at block 306 the netlist can be mapped to circuit structures that are available on a target IC device. At block 308, the netlist can be placed and routed. The place-androute phase of the design flow is the phase in which the disclosed approaches for incremental initialization by parent and child placer processes can be employed.

At block 310, the design tool generates implementation data from the placed-and-routed circuit design. The implementation data can be suitable for configuring programmable logic and routing resources of an FPGA or suitable for fabricating an ASIC. At block 312, an IC device can be made based on the implementation data. The IC device can be made by configuring a programmable IC with configuration data or fabricating an ASIC.

Figure 4:
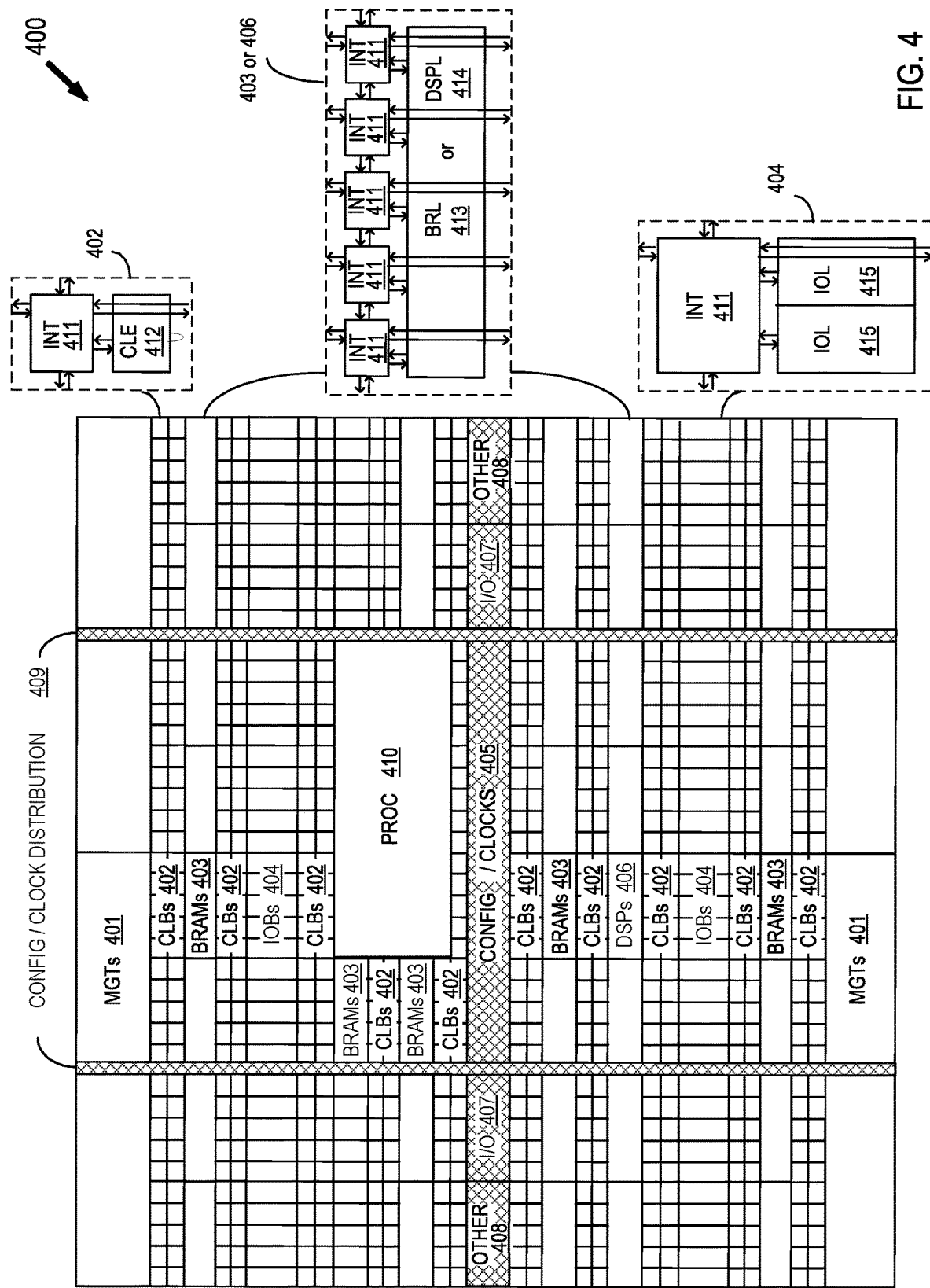
FIG. 4 shows a programmable integrated circuit (IC), which is an example of a target IC device on which a circuit design can be placed.

FIG. 4 shows a programmable integrated circuit (IC) 400, which is an example of a target IC device on which a circuit design can be placed. The programmable IC may also be referred to as a System On Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 406 can include a DSP logic element (DSPL) 414 in addition to an appropriate number of programmable interconnect elements. An 10B 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

A columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Figure 5:
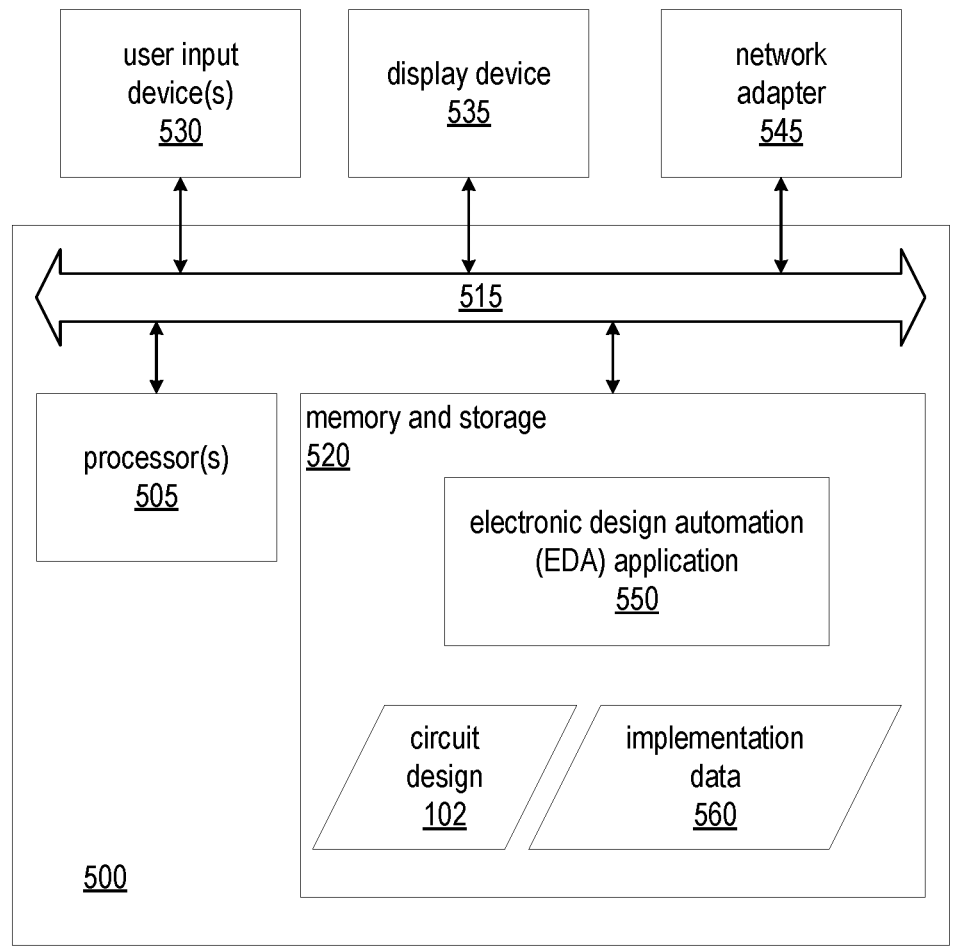
FIG. 5 is a block diagram illustrating an exemplary data processing system.

FIG. 5 is a block diagram illustrating an exemplary data processing system (system) 500. System 500 is an example of an EDA system. As pictured, system 500 includes at least one processor circuit (or "processor arrangement"), e.g., a central processing unit (CPU) 505 coupled to memory and storage arrangement 520 through a system bus 515 or other suitable circuitry. System 500 stores program code and circuit design 102 within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store an EDA application 550. EDA application 550, being implemented in the form of executable program code, is executed by processor(s) 505. As such, EDA application 550 is considered part of system 500. System 500, while executing EDA application 550, receives and operates on circuit design 102. In one aspect, system 500 performs a design flow on circuit design 102, and the design flow may include synthesis, mapping, placement, routing, and the generation of implementation data 560.

EDA application 550, circuit design 100, implementation data 560, and any data items used, generated, and/or operated upon by EDA application 550 are functional data structures that impart functionality when employed as part of system 500 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for placing circuit designs. Other aspects and features will be apparent to those skilled in the art from consideration of the specification. It is intended that the specification and drawings be considered as examples only, with a true scope of the invention being indicated by the following claims.

What is claimed is:

1. A method comprising:
providing access to checkpoint data of a design checkpoint of a circuit design and starting a plurality of child processes by a parent process executing on one or more computer systems;
generating an initial intermediate representation of the circuit design targeted to an integrated circuit (IC) device by the parent process;
loading, concurrent with the generating of the initial intermediate representation, the checkpoint data into respective memory spaces by the plurality of child processes executing on the one or more computer systems;
producing incremental updates to the design checkpoint by the parent process;
signaling availability of the incremental updates by the parent process to the plurality of child processes;
applying the incremental updates to the checkpoint data in the respective memory spaces by the plurality of child processes in response to the signaling availability of the incremental updates; and
processing the circuit design by the child processes in response to completion of producing incremental updates by the parent process.

2. The method of claim 1, wherein:
the initial intermediate representation is an initial placement;
the producing incremental updates includes floorplanning the circuit design by the parent process; and
the processing by the child processes includes performing detailed placement of the circuit design.

3. The method of claim 2, wherein:
the floorplanning includes the parent placer process writing the incremental updates to a shared database that is shared with the child placer processes;
the signaling availability of the incremental updates includes one or more of creating a file, storing data in a file, storing data in a shared memory, or communicating through a socket; and
the applying the incremental updates includes reading the incremental updates from the shared database.

4. The method of claim 2, wherein:
the floorplanning includes the parent placer process generating one or more scripts that specify the incremental updates;
the signaling availability of the incremental updates includes one or more of creating a file, storing data in a file, storing data in a shared memory, or communicating through a socket; and
the applying the incremental updates includes one or more of the child placer processes executing the one or more scripts, and execution of each script updating the respective memory space with the incremental updates.

5. The method of claim 2, further comprising performing detailed placement by one or more of the child placer processes.

6. The method of claim 2, further comprising, performing placement of respective portions of the circuit design by one or more of the child placer processes.

7. The method of claim 2, further comprising:
serializing data that specify one or more of area constraints, timing constraints, a netlist, and placement locations of elements in the netlist, wherein the serializing generates serialized data;
signaling availability of the serialized data to the plurality of child placer processes; and
deserializing the serialized data by the plurality of child placer processes.

8. The method of claim 2, further comprising starting the plurality of child placer processes by the parent placer process after the writing of the design checkpoint and before the floorplanning.

9. The method of claim 2, further comprising writing checkpoint data to the design checkpoint by each child placer process after the performing detailed placement.

10. The method of claim 2, wherein:
the providing access includes writing the checkpoint data to a checkpoint database in a storage device; and
the loading includes reading the checkpoint data from the checkpoint database.

11. The method of claim 2, wherein:
the providing access includes writing the checkpoint data to a socket; and
the loading includes reading the checkpoint data from the socket.

12. The method of claim 2, further comprising
generating implementation data; and
making an IC based on the implementation data to implement the circuit design on the IC.

13. The method of claim 1, wherein the parent process and the child processes synthesize the circuit design.

14. The method of claim 1, wherein the parent process and the child processes route the circuit design.

15. A system comprising:
a processor arrangement;
a memory circuit coupled to the processor arrangement and configured with instructions that when executed by the processor arrangement cause the processor arrangement to perform operations including:
provide access to checkpoint data of a design checkpoint of a circuit design and starting a plurality of child processes by a parent process;
generating an initial intermediate representation of the circuit design targeted to an integrated circuit (IC) device by the parent process;
loading, concurrent with the generating of the initial intermediate representation, the checkpoint data into respective memory spaces by the plurality of child processes;
producing incremental updates to the design checkpoint by the parent process;
signaling availability of the incremental updates by the placer process to the plurality of child processes;
applying the incremental updates to the checkpoint data in the respective memory spaces by the plurality of child processes in response to the signaling availability of the incremental updates; and
processing the circuit design by the child processes in response to completion of producing incremental updates by the parent process.

16. The system of claim 15, wherein:
the initial intermediate representation is an initial placement;
the producing incremental updates includes floorplanning the circuit design by the parent process; and
the processing by the child processes includes performing detailed placement of the circuit design.

17. The system of claim 16, wherein:
the instructions for floorplanning include instructions that cause the parent placer process to write the incremental updates to a shared database that is shared with the child placer processes;
the instructions for signaling availability of the incremental updates include instructions that cause the processor arrangement to perform one or more of creating a file, storing data in a file, storing data in a shared memory, or communicating through a socket; and
the instructions for applying the incremental updates include instructions for reading the incremental updates from the shared database.

18. The system of claim 16, wherein:
the instructions for floorplanning include instructions that cause the parent placer process to generate one or more scripts that specify the incremental updates;
the instructions for signaling availability of the incremental updates include instructions that cause the processor arrangement to perform one or more of creating a file, storing data in a file, storing data in a shared memory, or communicating through a socket; and
the instructions for applying the incremental updates include instructions that cause the processor arrangement to perform one or more of the child placer processes executing the one or more scripts, and execution of each script updating the respective memory space with the incremental updates.

19. The system of claim 16, wherein one or more of the child placer processes performs detailed placement.

20. The system of claim 16, wherein the memory is configured with instructions that when executed by the processor arrangement cause the processor arrangement to perform operations including:
serializing by the parent placer process, data that specify one or more of area constraints, timing constraints, a netlist, and placement locations of elements in the netlist, wherein the serializing generates serialized data;
signaling availability of the serialized data to the plurality of child placer processes; and
deserializing the serialized data by the plurality of child placer processes.

\* \* \* \* \*